United States Patent [19]

Kowalczyk et al.

[11] Patent Number: 5,450,607
[45] Date of Patent: Sep. 12, 1995

[54] UNIFIED FLOATING POINT AND INTEGER DATAPATH FOR A RISC PROCESSOR

[75] Inventors: Andre Kowalczyk, San Jose; Norman K. P. Yeung, Fremont, both of Calif.

[73] Assignee: MIPS Technologies Inc., Mountain View, Calif.

[21] Appl. No.: 63,183

[22] Filed: May 17, 1993

[51] Int. Cl.6 .............................................. G06F 15/00
[52] U.S. Cl. ................................... 395/800; 395/375; 364/DIG. 2; 364/931.55; 364/937.4; 364/937.1; 364/937.3
[58] Field of Search ................................. 395/800, 375

[56] References Cited

PUBLICATIONS

Fuller; "MIPS tips RISC plans from low to high end; Chip vendor outlines 4200 and a peek at T5"; May 1993.
Finney et al; "Using a Common Barrel Shifter for Operand Normalization, Operand Alignment and Operand Unpack and Pack in Floating Point".
Gillian et al. "Design and Architecture for a multi-mode pipelined, floating-point adder", May 1991; IEEE.
Enriquez et al. "Design of a multi-mode pipelined multiplier for Floating Point application"; May 1991; IEEE.
Taylor et al. "A 100 MHz Floating Point/Integer Processor" IEEE May 1990.

*Primary Examiner*—Alyssa H. Bowler
*Assistant Examiner*—L. Donaghue
*Attorney, Agent, or Firm*—Charles E. Krueger

[57] ABSTRACT

A 64-bit wide unified integer and floating-point datapath for a RISC processor. The unified datapath allows for the sharing of some of the major hardware resources within the integer and floating-point execution units, as well as simplifying a large portion of the peripheral circuitry. The unified datapath results in a more efficient use of the hardware with reduced average power dissipation and area, without compromising the major performance advantages of RISC processors.

2 Claims, 4 Drawing Sheets

UNIFIED FLOATING POINT AND INTEGER DATAPATH FOR A RISC PROCESSOR

BACKGROUND OF THE INVENTION

This invention relates generally to a computer with a reduced instruction set, and more particularly to such computer having a unified data path for integer and floating point instructions.

From the standpoint of instruction sets in a processor, computer architects have developed two general approaches: complex instruction set computer (CISC) processors provide an extensive set of optimized instructions to address all sorts of special-purpose needs, while reduced instruction set computer (RISC) processors provide, in general, a smaller set of more simplified and uniform instructions from which more complex instructions can be constructed. The wide range and complexity of the instructions provided by CISC processors contribute to the complexity of the hardware and reduce the efficiency of a chip as a whole. Techniques such as microcoding and trap and emulate have made the increasing complexity of the CISC processor hardware design more manageable. However, for high end CISC processors, where optimization of speed and performance is the goal, implementation of the hardware remains highly complex and very expensive.

The contrasting RISC approach aims to simplify instruction formats as much as possible so that the design of a machine can be made more efficient. RISC designs take advantage of the fact that some of the more elaborate CISC instructions are either not used at all by most compilers, or if they are, they are used very rarely. There is, therefore, an emphasis on a smaller number of uniform instruction formats, preferably all of the same size. The regularity of these formats simplifies the instruction-decoding mechanism and allows for the use of pipelining in which several instructions are being executed at once.

Simple and uniform instruction formats, pipelining of several instructions, simplified memory addressing and register-to-register operations are some of the typical features of a RISC processor design. The combination of these techniques has made possible high performance RISC processors with very efficient architectures and maximum throughput (i.e. execution rates of one instruction per clock cycle). With further refinements, these techniques have produced a family of successful RISC processors based on the MIPS architecture (R2000, R3000, R4000 and R6000) developed by MIPS Technology Inc., a wholly owned subsidiary of Silicon Graphics, Inc. of Mountain View, Calif.

RISC processor designs continue to push the state of the art to further increase efficiency and throughput to achieve execution rates of even greater than one instruction per clock cycle. However, while this trend has resulted in very high performance RISC processor chips, there has been a parallel increase in power dissipation and cost. As a result, portable computing devices such as desktop and notebook computers have not benefited from the high performance levels provided by RISC processors.

From the above it can be appreciated that there is a need for a low-power, low-cost RISC processor that provides the high performance advantages of RISC designs with reduced cost and power dissipation for portable computing devices.

SUMMARY OF THE INVENTION

The present invention offers a processor based on the MIPS RISC architecture that meets the requirements of low-cost applications without compromising performance.

The processor of the present invention achieves reductions in power dissipation and chip area by combining the hardware required by the integer datapath and the floating-point datapath to create a unified data path for both operations. Several of the major resources required by the floating-point execution unit can also be used to perform integer operations and vice versa. The processor of the present invention eliminates the need to duplicate these resources in a separate integer datapath by modifying them such that integer operations can be fully accommodated in the same datapath that performs floating-point operations.

Accordingly the present invention provides in a reduced instruction set computer processor having a multi-stage pipelined datapath, a unified integer and floating-point datapath that includes: a register file combining 32 64-bit general purpose registers and 32 64-bit floating-point registers; an operand pipeline network, including a plurality of pipeline registers and multiplexers, for feeding back results of selected pipeline stages during integer and floating-point operations; a 64-bit execution unit including a combined integer/mantissa datapath and an exponent datapath; and a bus network coupling the register file to the pipeline network and the execution unit.

While parallel processing of integer and floating-point operations is no longer possible by the unified datapath of the present invention, there are a number of significant advantages to the sharing of the resources that result in lower average power and much higher efficiency.

A further understanding of the nature and advantages of the present invention may be gained by reference to the diagrams and detailed description below.

DESCRIPTION OF THE PREFERRED EMBODIMENT

Most high-end microprocessors are designed to perform floating-point computations. Because of the differing format of a floating-point number as compared to integers, additional specialized hardware is required to fully implement floating-point operations. The format of a floating-point number includes a mantissa (or fraction) portion and an exponent portion. These two portions of the floating-point number have different processing requirements resulting in two separate datapaths within a floating-point datapath to process the mantissa and the exponent. Furthermore, reduced instruction set computer (RISC) processors perform integer operations in a single clock cycle, while floating-point operations require multiple clock cycles. It is therefore desirable to be able to process single-cycle integer operations in parallel with multiple-cycle floating-point operations. For these reasons, existing RISC processors have separate datapaths for integer and floating-point operations.

Figure 1:
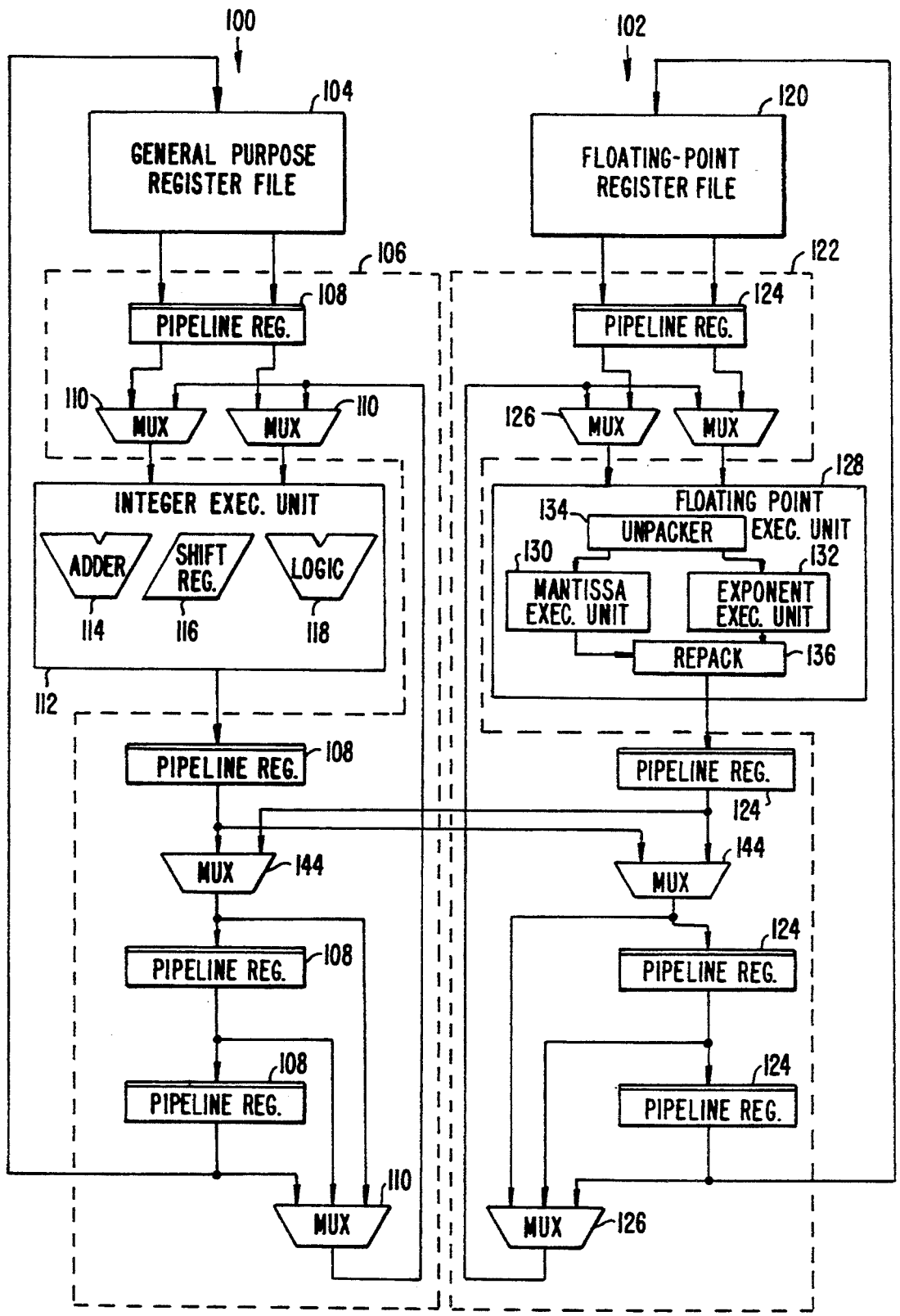
FIG. 1 is a simplified block diagram of a prior art RISC processor showing dual datapaths for integer and floating-point operations.

FIG. 1 is a simplified block diagram of a RISC processor with two separate datapaths, an integer datapath 100 and a floating-point datapath 102. The integer datapath 100 comprises a general purpose register file 104 that includes, for example, 32 64-bit registers. An operand pipeline network 106 made up of pipeline registers 108 and bypass multiplexers 110 receive 64-bit operands from register file 104 and provide for feedback from different stages of the pipeline. This helps minimize delays in one pipeline clock cycle by allowing instructions to proceed without having to wait for results of a preceding operation to be written back into the register file 104. The integer datapath 100 also includes an integer execution unit 112. The integer execution unit 112 typically includes several main functional units such as a 64-bit adder 114, a 32-bit bidirectional shifter 116 and a boolean logical unit 118. The results of the functional blocks are fed back to the register file 100 through the operand pipeline network 106.

The floating-point datapath 102 comprises a floating-point register file 120 that includes, for example, 32 64-bit registers. An operand pipeline network 122 that includes pipeline registers 124 and bypass multiplexers 126. The operand pipeline network 122 connects to the floating-point datapath 102 in a similar fashion to the integer datapath 100 pipeline network 106 and performs a similar pipelining function. The floating-point datapath 102 further includes a 64-bit floating-point execution unit 128 that is divided further into a mantissa execution unit 130, which is for example 53 bits wide, and an exponent execution unit 132, that is 11 bits wide. An unpacker 134 divides up the 64-bit operand into the mantissa and exponent parts, which get repacked by repacker 136 at the output of the execution unit 128. The mantissa execution unit 130 typically includes an adder, a shifter and normalization logic. The design of the exponent execution unit 132 is very specialized and typically includes an adder and a constant-generating logic as well as other random logic.

Interface between the two datapaths 100 and 102 is provided through additional bus lines and multiplexers 144 in the pipeline structure of the operand pipeline networks 106 and 122.

The dual datapath RISC processor of FIG. 1 therefore duplicates a number of hardware units. This results in a higher average power dissipation and requires larger silicon area to implement. The present invention eliminates the duplicate hardware units by combining the two separate datapaths into a single datapath where common resources are shared between the two types of operations.

Figure 2:
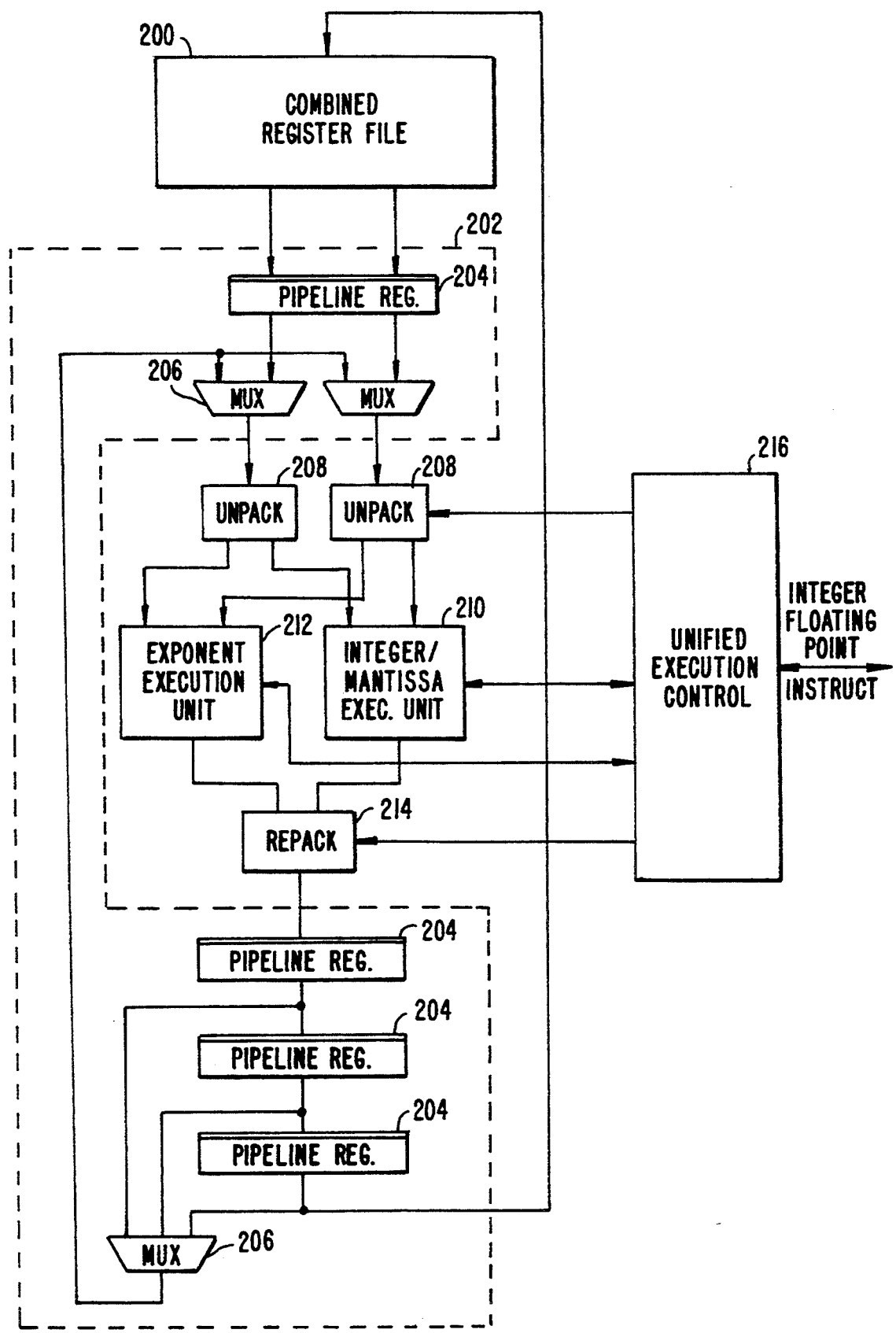
FIG. 2 is a simplified block diagram of the unified datapath of the present invention.

FIG. 2 is a simplified block diagram of the unified integer and floating-point datapath according to the present invention. The unified datapath includes a register file 200 which combines, for example, 32 64-bit general purpose registers with 32 64-bit floating-point registers. An operand pipeline network 202 provides the pipelining and bypass mechanism through pipeline registers 204 and bypass multiplexers 206. Unpackers 208 either partition an operand into mantissa and exponent bits (for floating-point operations) or simply pass it through (for integer operations) to a 64-bit combined integer/mantissa execution unit 210 and an exponent execution unit 212 that is, for example, 11 bits wide. The combined integer/mantissa execution unit 210 includes one set of functional blocks that perform operations on both integers and the mantissa portion of floating-point numbers (as described in connection with FIG. 3). Finally, the outputs of integer/mantissa and exponent execution units 210 and 212 are regrouped together by a repacker 214 for floating-point operations.

Some of the advantages of the unified datapath of the present invention become apparent at the level of the block diagram as depicted in FIG. 2. First, implementing the operand pipeline network 202 is significantly less cumbersome and less complex as compared to the two separate operand pipeline networks 106 and 122 (FIG. 1). Not only the required hardware is reduced by half, there is no longer a need for additional multiplexers and buses to provide an interface mechanism between two separate datapaths.

Further enhancements to the floating-point and integer operations in the unified datapath are realized by the fact that the combined integer/mantissa execution unit 210 must be 64 bits wide to meet the requirements of integer operations. As compared to the 53-bit mantissa execution unit 130 of the floating-point datapath 102 of FIG. 1, operations on the mantissa portion of a floating-point operand gain "free" extra bits. This allows for further optimization of the processor architecture. For example, the IEEE standards for binary floating-point architecture, IEEE/ANSI Standard 754-1985, require three additional bits (guard/round/sticky) to perform floating-point operations. Existing RISC processors have developed additional hardware, usually separate from the floating-point execution unit, to implement this requirement. However, the extra "free" bits in the combined integer/mantissa execution unit 210 can be utilized during floating-point operations to allow for built-in guard/round/sticky collection logic without incurring additional costs.

Further optimization of the processor architecture is made possible by the unified datapath of the present invention by unifying execution control blocks. A dual datapath architecture requires an execution control unit for the integer data path to configure the integer operand pipeline network 106 as well as the integer execution unit 112, and a separate execution control unit for the floating-point operand pipeline network 122 and execution unit 128. Since the unified operand pipeline network 202 of the present invention and the integer/mantissa execution unit 210 are considerably smaller and less complex, a unified execution control unit 216 with a single super set of instructions can replace the two separate execution units. Functions common to integer and floating-point operations can now be optimized and processed more efficiently with a unified control unit.

Figure 3:
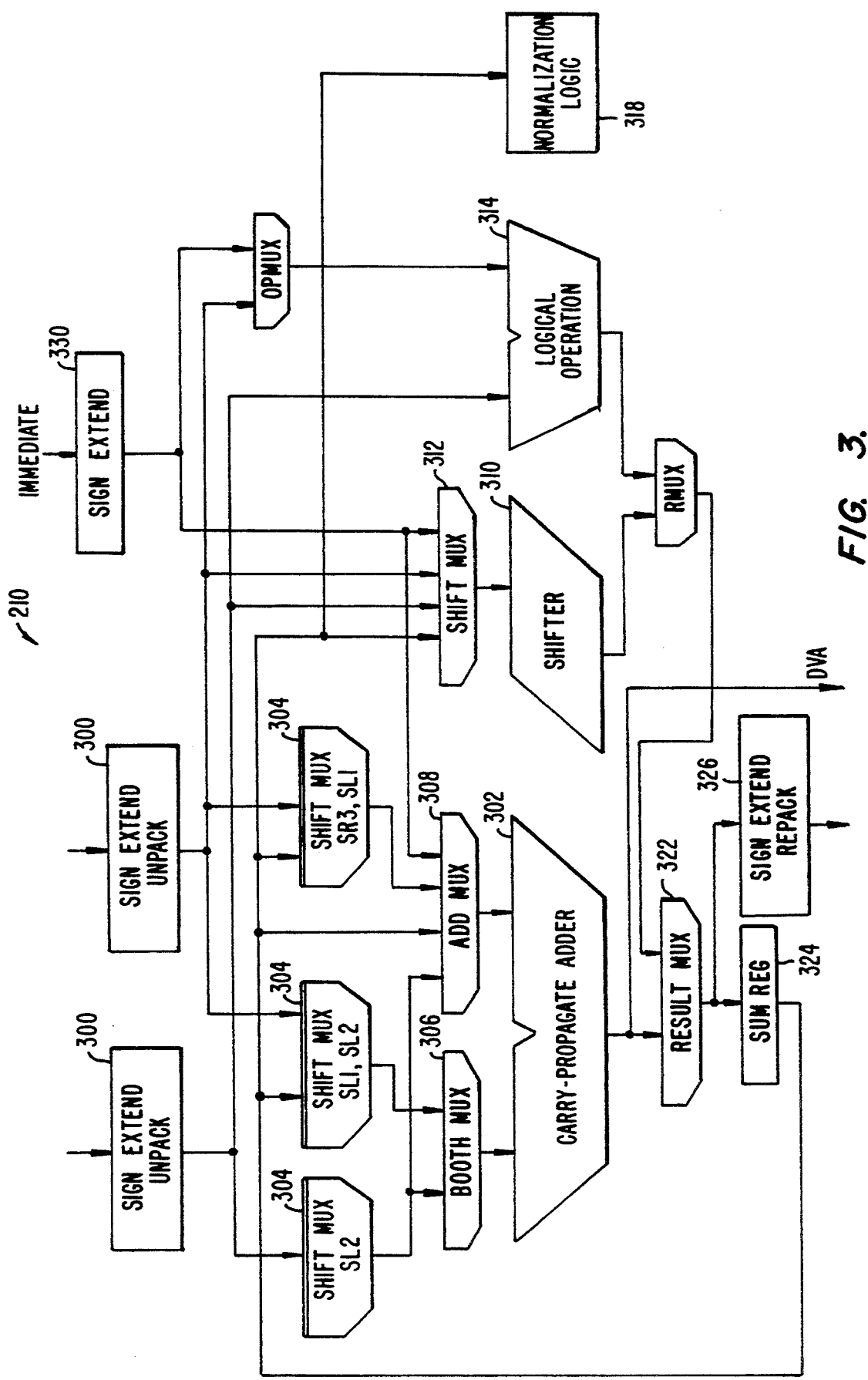
FIG. 3 is a more detailed block diagram of the present invention showing a unified integer/mantissa execution unit.

Other power and cost savings are realized by combining the functional blocks of the two execution units 112 and 128 (FIG. 1) into a single set of shared blocks in the combined integer/mantissa execution unit 210. FIG. 3 is a more detailed diagram of the internal circuitry of the combined integer/mantissa execution unit 210. The execution unit 210 is 64 bits wide and is designed to be compatible with both 32-bit and 64-bit operands for integers and floating-point numbers. It includes unpackers 300 that receive the operands from the register file 200 and through the pipeline network 202. The outputs of the unpackers 300 feed several main functional blocks. An adder 302 receives the operands (or mantissa in case of floating-point numbers) through shift multiplexers 304, a booth multiplexer 306 and an add multiplexer 308. A shifter 310 receives the operands through a shift multiplexer 312, and a boolean logical unit 314 receives the operands through a multiplexer OPMUX 316. The outputs of the shifter 310 and the logical unit 314 are multiplexed by RMUX 320 whose output is further multiplexed along with the output of the adder 302 by a result multiplexer 322. The output of result multiplexer 322 feeds a sign extend/repacker 326 and is also loaded into a sum register 324. The output of the sum register 324 is used in subsequent stages of a multi-cycle integer and floating-point instruction execution. It feeds back into several of the multiplexers and feeds other main functional blocks, such as normalization logic 318. A sign extend block 330 receives an immediate field from an instruction in one of the pipeline stages and conditionally sign extends immediate operands as they come into the datapath and feeds the output to the shift multiplexer 312 and OPMUX 316.

The combined integer/mantissa execution unit 210 uses signals from the unified control unit 216 to control the flow of data within its datapath and specify operations within the main functional units. Operands read from the register file are sign extended if required (integer) or unpacked (floating-point) by unpackers 300 before use by execution functional units. Relevant fields within an executing instruction are staged and applied to their corresponding functional units, and inputs to functional units are selected and functions applied according to the local decoding of the staged operational field of instruction. The result is sign extended if necessary (integer) or repacked (floating-point) by repacker 326 before it is either stored in a cache memory subsystem or written back to the register file.

Unpackers 300 accept an IEEE single (32 bit) or double (64 bit) precision operand and separate the sign, exponent and mantissa fields. The unpackers 300 also append guard, round and sticky bits, all initially zero, to the LSB of the mantissa field and feed this value into the datapath. The sign extend/repacker 326 accepts a 53-bit floating-point mantissa, an 11-bit exponent, and a 1-bit sign and reformats them into an IEEE single or double precision operand. It also performs a 32-bit sign extension of the input for integer operations.

The adder 302 is, for example, a carry-propagate adder that performs addition of two 64-bit operands (in two's complement) and a carry-in, and produces a 64-bit sum and a carry out. The adder 302 is also used to compute data virtual address for load and store instructions. The generated data virtual addresses are available at a DVA output. Another function performed by the adder 302 is comparing two operands in trap instructions. The shifter 310 is a 64-bit left/right shifter with a post word swap for store alignment. Right shifts may be either arithmetic, where the result is sign extended, or logical, where the result is zero filled. The logical unit 314 performs bitwise boolean operations, detects equal operands for operand comparisons, and determines the outcome of conditional branches and traps. The normalization logic 318 is used in floating-point addition and subtraction operations to indicate by how many places the sum/difference needs to be shifted to produce a normalized floating-point result, and to indicate how much the exponent needs to be adjusted.

Figure 4:
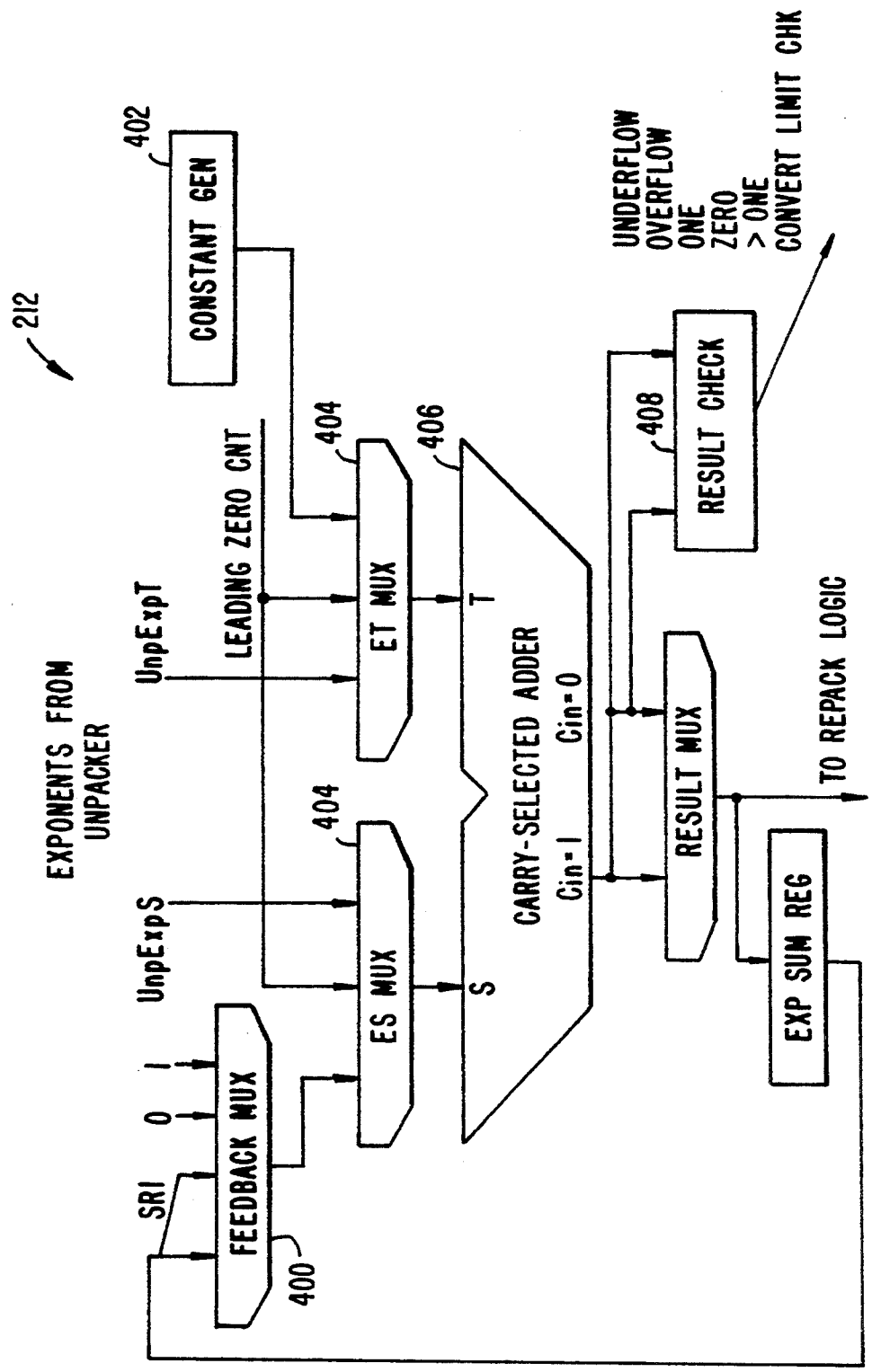
FIG. 4 is a more detailed block diagram of the present invention showing an exponent execution unit.

FIG. 4 shows the exponent execution unit 212. It is 12 bits wide, with the twelfth bit (MSB) used as both sign bit and overflow bit. The exponent execution unit 212 includes a feedback multiplexer 400 and a constant generating logic 402 to produce 12-bit values based on its inputs from the unified control unit 216. The outputs of the feedback multiplexer 400 and constant generating logic 402 feed two operand multiplexers 404 which select the inputs for a carry select adder 406. The execution unit 212 further includes a register 408 to hold the selected result from the adder. The structure and operation of the exponent execution unit 212 remains substantially unaffected by the unification of the two datapaths according to the present invention.

Therefore, as compared to the existing dual datapath RISC processors, the combined integer/mantissa execution unit 210 provides for further savings in hardware, and thus cost and average power dissipation. Instead of two adders and two shifters, only a single 64-bit adder and a single 64-bit shifter are used to perform both integer and floating-point operations.

However, there is a performance trade off in that parallel processing of integer and floating-point operations is no longer possible. In RISC processors, parallel processing mainly benefits the floating-point operations which are multi-cycle operations as opposed to integer operations which are single clock cycle operations. This is so because the processor will not have to wait for the completion of a multi-cycle floating-point operation before processing subsequent integer operations.

An object of the unified datapath RISC processor of the present invention is to offer a low-cost, low-power RISC processor for portable computing applications without compromising the major performance benefits of a RISC processor. This has been accomplished by ensuring that no additional latency is introduced for integer operations. Therefore, the compromise in performance has been a reduction in throughput only when a mix of floating-point and integer operations are performed by the processor.

The unified datapath of the present invention improves certain aspects of the floating-point operation as well. One example is the availability of the boolean logical unit 314 to perform logical operations on the mantissa portion of a floating-point number. To perform an equality compare in a floating-point operation, the existing RISC processors typically either use a special hardware inside the floating-point execution unit, or use the adder to perform the compare in several cycles. With the combined integer/mantissa execution unit 210 of the present invention, the boolean logical unit 314 can be used to perform a comparison in a floating-point operation in a single cycle. Furthermore, as discussed above, the floating-point datapath no longer requires a separate control unit. The combined control unit 216 handles both integer and floating-point operations. The reduction in the amount of hardware required by the unified datapath architecture of the present invention directly translates to a shorter design cycle. This in turn results in reduced development costs and a faster turnaround.

In conclusion, the present invention offers a RISC processor with a unified integer and floating-point datapath to reduce power dissipation and area without compromising the major performance advantages of RISC processors. The unified datapath allows for the sharing of some of the major hardware resources within the integer and floating-point execution units, as well as simplifying a large portion of the peripheral circuitry. While the above is a complete description of the present invention, it is possible to use various alternatives, modifications and equivalents. For example, other types of processors such as those designed using digital signal processing (DSP) techniques can also benefit from the advantages offered by the 64-bit unified datapath of the present invention. With respect to implementation, for example, in the combined integer/mantissa execution unit 210, multiplication can be performed by a multiplier array instead of using booth logic and registers with the adder 302. Therefore, the scope of the present invention should be determined not with reference to the above description but should, instead, be determined with reference to the appended claims, along with their full scope of equivalents.

What is claimed is:

1. In a reduced instruction set computer (RISC) processor having a multi-stage pipelined datapath, a unified integer and floating-point datapath comprising:
    a register file combining a plurality of general purpose registers and a plurality of floating-point registers;
    an integer/mantissa execution unit, coupled to said register file, said integer/mantissa execution unit comprising:
        an adder,
        a shifter,
        a Boolean logic functional unit,
        a normalization logic unit, and
        a multiplexing network selectively routing operands to said adder, shifter, Boolean logic functional unit and normalization logic unit,
    an exponent execution unit coupled to said register file; and
    a unified control unit incorporating a superset of integer and floating-point instructions, said unified control unit coupled to said integer/mantissa execution unit and said exponent execution unit for controlling the operation and flow of operands through said integer/mantissa and exponent execution units,
    wherein said multiplexing network in said integer/mantissa execution unit comprises:
        a plurality of shift multiplexers having inputs coupled to receive operands, and having control inputs coupled to said unified control unit;
        a booth multiplexer having inputs coupled to outputs of said shift multiplexers, and an output coupled to a first input of said adder;
        an add multiplexer having inputs coupled to outputs of said shift multiplexers, and an output coupled to second input of said adder;
        a first multiplexer having inputs coupled to an output of said shifter and an output of said Boolean logic functional unit, respectively, a control input coupled to said unified control unit, and an output;
        a result multiplexer having a first input coupled to an output of said adder, a second input coupled to an output of said first multiplexer, and a control input coupled to said unified control unit; and
        a sum register for temporarily storing an output of said result multiplexer, and for feeding back said output of said result multiplexer to said shift multiplexers.

2. In a reduced instruction set computer (RISC) processor having a multi-stage pipelined datapath, a unified integer and floating point datapath comprising:
    a register file combining a plurality of general purpose registers and a plurality of floating-point registers;
    an unpacker coupled to said register file;
    an integer/mantissa execution unit coupled to said unpacker, comprising:
        a plurality of input multiplexers having inputs coupled to receive operands form said unpacker,
        a carry-propagate adder having a first and a second input coupled to outputs of said plurality of input multiplexers,
        a shifter having an input coupled to an output of said plurality of input multiplexers,
        a Boolean logic functional block having inputs coupled to said unpacker,
        a first multiplexer having inputs coupled to an output of said shifter and an output of said Boolean logic functional block, respectively, and an output, and
        a result multiplexer having a first input coupled to an output of said carry-propagate adder, a second input coupled to an output of said first multiplexer;
    an exponent execution unit coupled to said unpacker, comprising:
        a first and a second operand multiplexer coupled to receive operands from said unpacker,
        a carry-selected adder having a first input and a second input coupled to an output of said first operand multiplexer and an output of said second operand multiplexer, respectively, and
        a result multiplexer having two inputs coupled to outputs of said carry-selected adder;
    a repacker coupled to outputs of said exponent execution unit and said integer/mantissa execution unit; and
    a unified execution control unit coupled to said integer/mantissa execution unit and said exponent execution unit, said unified execution control unit incorporating a superset of integer and floating-point instructions for controlling the operation and flow of operands through said integer/mantissa and said exponent execution units.

* * * * *